(12) United States Patent  (10) Patent No.: US 8,996,197 B2
Joh et al.                  (45) Date of Patent:     Mar. 31, 2015

(54) LANE MONITORING WITH ELECTRONIC HORIZON

(71) Applicant: Ford Global Technologies, LLC, Dearborn, MI (US)

(72) Inventors: Peter G. Joh, Bloomfield Hills, MI (US); Thomas E. Pilutti, Ann Arbor, MI (US); Matt Y. Rupp, Canton, MI (US); Dorian Jack Spero, Reading, MA (US); Brian Wolski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/922,535

(22) Filed: Jun. 20, 2013

(65) Prior Publication Data

US 2014/0379164 A1    Dec. 25, 2014

(51) Int. Cl.
*B62D 6/00*    (2006.01)
*G01C 21/30*   (2006.01)

(52) U.S. Cl.
CPC ....................................... *G01C 21/30* (2013.01)
USPC .................. 701/1; 701/36; 701/41; 701/300; 701/301; 701/302

(58) Field of Classification Search
CPC .............................. G01C 21/005; G01C 21/26
See application file for complete search history.

(56) References Cited

U.S. PATENT DOCUMENTS

| | | | |
|---|---|---|---|
| 6,405,128 B1 | 6/2002 | Bechtolsheim et al. | |
| 6,597,984 B2 | 7/2003 | Appenrodt et al. | |
| 6,735,515 B2 | 5/2004 | Bechtolsheim et al. | |
| 6,836,719 B2 | 12/2004 | Andersson et al. | |
| 6,853,908 B2 | 2/2005 | Andersson et al. | |
| 7,260,465 B2 | 8/2007 | Waldis et al. | |
| 7,415,134 B2 | 8/2008 | Ikeda et al. | |
| 8,405,522 B2 | 3/2013 | Shaffer et al. | |
| 8,433,100 B2 | 4/2013 | Nakamori et al. | |
| 8,447,519 B2* | 5/2013 | Basnayake et al. | 701/501 |
| 8,543,292 B2* | 9/2013 | Choi | 701/41 |
| 8,706,352 B2* | 4/2014 | Hayakawa et al. | 701/41 |
| 8,744,675 B2* | 6/2014 | King et al. | 701/36 |
| 2004/0186650 A1* | 9/2004 | Tange et al. | 701/96 |
| 2007/0021912 A1* | 1/2007 | Morita et al. | 701/211 |
| 2009/0088978 A1 | 4/2009 | Ishikawa et al. | |
| 2009/0228204 A1* | 9/2009 | Zavoli et al. | 701/208 |
| 2009/0299617 A1 | 12/2009 | Denaro | |
| 2010/0030430 A1* | 2/2010 | Hayakawa et al. | 701/42 |
| 2010/0082248 A1* | 4/2010 | Dorum et al. | 701/209 |
| 2010/0098295 A1* | 4/2010 | Zhang et al. | 382/103 |
| 2010/0104199 A1* | 4/2010 | Zhang et al. | 382/199 |
| 2010/0191461 A1* | 7/2010 | Zeng | 701/208 |

(Continued)

*Primary Examiner* — Jonathan M Dager
(74) *Attorney, Agent, or Firm* — Frank MacKenzie

(57) ABSTRACT

Apparatus for a vehicle operated on a roadway having lane markers includes an optical sensor providing optical data of the roadway. A first lane model is stored in an electronic memory in response to detected lane markers in the optical data. An electronic horizon system tracks a position of the vehicle and provides roadway data in response to the position. A second lane model is stored in the electronic memory in response to the roadway data. A confidence checker compares a discrepancy between the first and second lane models to a threshold in order to determine a confidence level. An output selector selects the first lane model when lane markers are detected in the optical data, and selects the second lane model if the lane markers are not detected in the optical data and the confidence level is greater than a predetermined level.

15 Claims, 5 Drawing Sheets

(56) References Cited

U.S. PATENT DOCUMENTS

| | | | |
|---|---|---|---|
| 2010/0253540 A1* | 10/2010 | Seder et al. | 340/905 |
| 2010/0292886 A1* | 11/2010 | Szczerba et al. | 701/29 |
| 2010/0332127 A1 | 12/2010 | Imai et al. | |
| 2011/0169958 A1* | 7/2011 | Imai et al. | 348/149 |
| 2012/0050138 A1* | 3/2012 | Sato et al. | 345/4 |
| 2012/0053755 A1* | 3/2012 | Takagi | 701/1 |
| 2012/0226411 A1* | 9/2012 | Kuoch et al. | 701/36 |
| 2012/0314070 A1* | 12/2012 | Zhang et al. | 348/148 |
| 2013/0141520 A1* | 6/2013 | Zhang et al. | 348/36 |
| 2013/0148368 A1* | 6/2013 | Foltin | 362/466 |
| 2013/0158871 A1* | 6/2013 | Joh | 701/532 |
| 2013/0226400 A1* | 8/2013 | King et al. | 701/36 |
| 2014/0032108 A1* | 1/2014 | Zeng et al. | 701/533 |
| 2014/0129073 A1* | 5/2014 | Ferguson | 701/23 |
| 2014/0142780 A1* | 5/2014 | Chen et al. | 701/1 |

\* cited by examiner

LANE MONITORING WITH ELECTRONIC HORIZON

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to monitoring a location of a roadway lane relative to a vehicle, and, more specifically, to improved lane detection during times when optical identifiers are not present.

Automatic lane detection and monitoring is useful for supporting various driver assistance systems such as a lane departure warning system or a lane keeping assist system. The primary sensor being used in conventional lane detection systems is vision-based, e.g., an optical camera. A lane detection algorithm detects lane markings such as painted lane lines or surface features corresponding to a road edge, and then estimates a vehicle's lateral position within the lane, the lane width, and the vehicle's heading angle with respect to the lane.

Currently used image processing technologies in lane detection algorithms have sufficiently advanced to detect various kinds of lane markings and road edges in a wide range of conditions. However, the lane markings on road surfaces can still be hard to detect. They may be worn away or covered by dirt. There are many other possible impediments that cause the optical system to fail to detect the lane location, such as shadows, overhead bridges, rain, and snow. In such cases, gaps may form in the representation of the lane being tracked. When the lane is lost by the optical system, the lane departure warning/lane keeping assist system is disabled so that no action is taken based on inaccurate or missing information.

It would be desirable to estimate or fill-in any missing lane markings in order to improve overall system availability. When multiple lane borders are being tracked and the markings for one border temporarily disappear, it is known to reconstruct the missing border at a fixed offset distance from the detected border. Nevertheless, instances still occur when the camera-based system is unable to produce a valid output.

Another possibility for lane tracking is through the use of geopositioning to pinpoint a vehicle location and correlate that location onto a digital map representing the roadway. Geographic coordinates are typically measured with an on-board GPS receiving-unit and/or a dead-reckoning system based on inertial sensor outputs in the is vehicle. In addition to the current position, these systems can also provide an instantaneous vehicle speed and heading angle.

Map databases have been constructed for the most of the roads in the country, making it theoretically possible to determine lane placement of the vehicle. Geometric and attribute information about the roadway at the matching coordinates for the vehicle can be looked up from the digital map database. The collection of this road information around a vehicle is called an Electronic Horizon (EH). In a typical EH system, roadways are composed of many road segments (also called links) for which the road geometric and attribute information is defined. The geometric information of a road segment includes the longitude, latitude, elevation, horizontal curvature, and grade along the road. The road attribute information may include road signs, number of lanes, road function class (e.g., freeway, ramp, arterial), lane marking type, paved/unpaved, and divided/undivided.

Although the number of lanes may be represented, the map database typically does not directly represent the coordinates of individual lanes because of the significant increase in the volume of data that would have to be represented. Instead, the links represent a one-dimensional pathline that typically corresponds with the centerline of the roadway. Even in the event that a digital map database does directly represent actual lane boundaries for a given roadway, issues of sporadic positional errors and intermittent availability of the geopositioning systems have limited the reliability of these systems. Consequently, optical camera-based lane monitoring systems have usually been preferred over GPS-based.

SUMMARY OF THE INVENTION

The present invention employs an optical-based system as a primary detector and uses a geopositioning system as a backup data source when optical data is unavailable, wherein the validity of the geopositioning data is enhanced using an offset adjustment derived during times that optical data is available.

In one aspect of the invention, an apparatus for a vehicle operated on a roadway having lane markers comprises an optical sensor providing optical data of the roadway. A first lane model is stored in an electronic memory in response to detected lane markers in the optical data. An electronic horizon system tracks a position of the vehicle and provides roadway data in response to the position. A second lane model is stored in the electronic memory in response to the roadway data. A confidence checker compares a discrepancy between the first and second lane models to a threshold in order to determine a confidence level. An output selector selects the first lane model when lane markers are detected in the optical data, and selects the second lane model if the lane markers are not detected in the optical data and the confidence level is greater than a predetermined level.

DETAILED DESCRIPTION OF PREFERRED EMBODIMENTS

Figure 1:
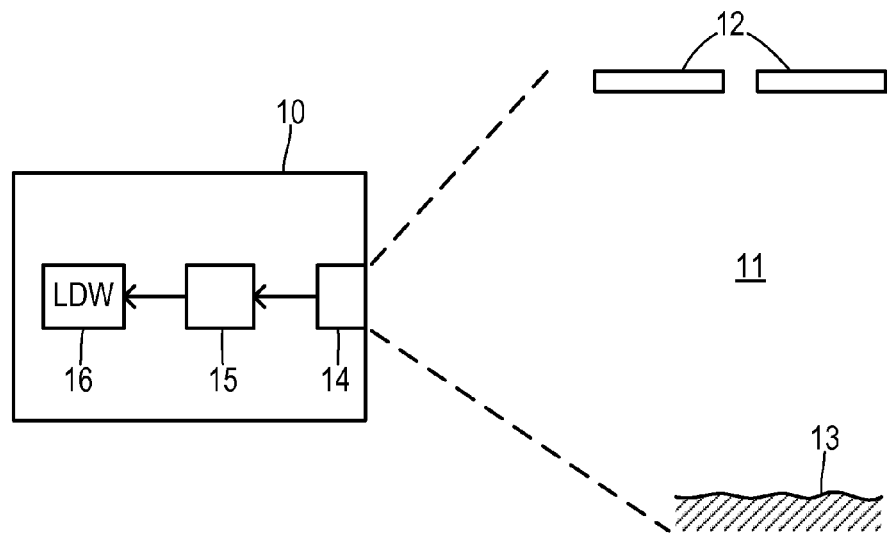
FIG. 1 is a block diagram showing a vehicle having an optical-based lane detection system.

Referring now to FIG. 1, a vehicle 10 moves along a roadway 11 in a lane bordered by painted lane lines 12 and a road edge 13. Vehicle 10 includes a camera system 14 coupled to a lane monitoring module 15 which may include a pattern recognizer for detecting lane markings such as lane lines 12 and road edge 13 in order to monitor the position of vehicle 10 relative to a detected lane. Information concerning the relative position of vehicle 10 and the edges of detected lanes around vehicle 10 is provided to a lane departure warning system 16 which may generate a driver alert in the event that vehicle 10 starts to wander out of its lane. Another type of driver assistance system that depends on the lane position information is an adaptive cruise control system, wherein target vehicle selection is improved by the use of EH and camera-based lane information. In general, the driver assistance system controls a driver assistance parameter (e.g., the generation of a warning or adjusting a vehicle set speed) in response to the automatically generated lane model that reports the positions of the host vehicle and surrounding vehicles according to the detected lanes.

Figure 2:
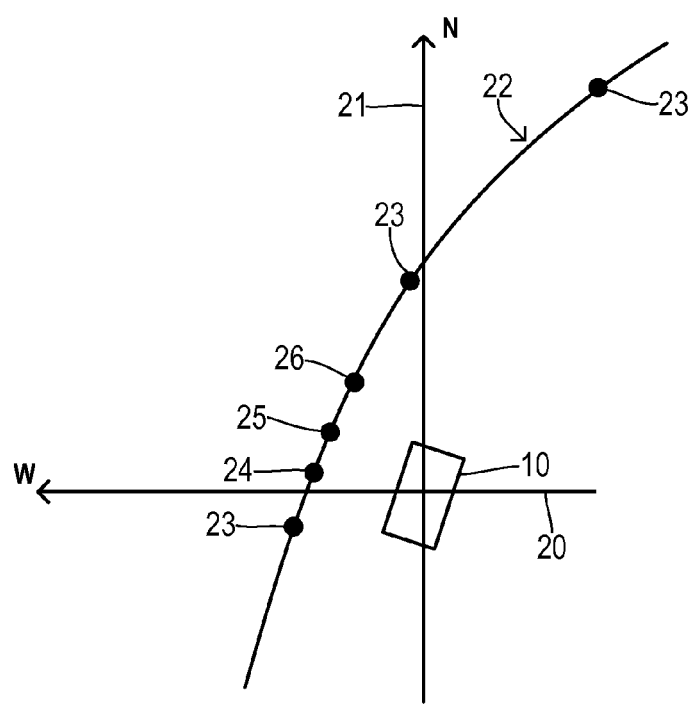
FIG. 2 is a diagram showing relative positions of a vehicle and a pathline of a roadway from a digital map database.

In the present invention, road segments represented in a digital map database are used to derive a secondary lane tracking model that can be used during times that a primary, optically-derived lane model becomes unavailable. As shown in FIG. 2, vehicle 10 has instantaneous geographic coordinates according to an east-west latitude line 20 and a north-south longitude line 21. Vehicle 10 is traveling on a roadway having a pathline 22 that is represented in a digital map database as a plurality of segments between a plurality of successive points 23 or by a mathematical equation representing the road shape. For each point on pathline 22, a curvature of the roadway at the respective point is stored along with the geographic coordinates of the point. For purposes of the present invention, it may be desirable to create a series of interpolated points 24-26 between consecutive points 23 in order to obtain a desired level of accuracy of a represented pathline. The positions of points 24-26 are generated according to a predetermined spacing such as about one meter, and are calculated according to the curvature at the adjacent points 23. Between each of points 24-26 the pathline follows a straight line to facilitate the calculations described below.

Figure 3:
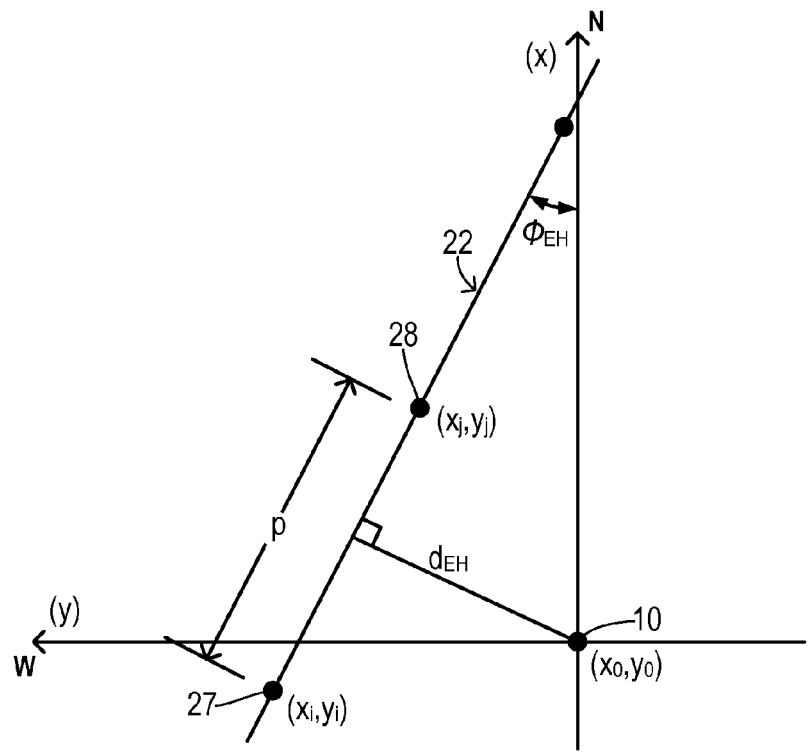
FIG. 3 shows a derivation of a shortest distance between a vehicle position and a pathline.

In order to identify a relative position of vehicle 10 with respect to pathline 22, the point on pathline 22 nearest to vehicle 10 is determined as shown in FIG. 3. Vehicle 10 is located at coordinates $(x_0, y_0)$ (e.g., obtained from a GPS unit) and the two closest (interpolated) points 27 and 28 on pathline 22 have coordinates $(x_i, y_i)$ and $(x_j, y_j)$ respectively. Points 27 and 28 are separated by the predetermined spacing p. The distance $d_{EH}$ is determined according to the formula:

$$d_{EH} = ((x_j - x_i) \cdot (y_0 - y_i) - (x_0 - x_i) \cdot (y_j - y_i))/p.$$

The distance $d_{EH}$ gives the lateral offset distance between vehicle 10 and map-derived pathline 22 which although it does not correspond with any particular lane border should run parallel to all the lanes. Pathline 22 between points 27 and 28 further has a heading direction represented as an angle $\phi_{EH}$ which is measured with respect to north. Heading angle $\phi_{EH}$ can be derived according to the formula:

$$\phi_{EH} = \begin{cases} \tan^{-1}\left(-\dfrac{x_j - x_i}{y_j - y_i}\right) - \dfrac{\pi}{2} & \text{if}\left(\dfrac{y_j - y_i}{x_j - x_i}\right) \leq 0 \\ \text{or} \\ \tan^{-1}\left(-\dfrac{x_j - x_i}{y_j - y_i}\right) + \dfrac{\pi}{2} & \text{if}\left(\dfrac{y_j - y_i}{x_j - x_i}\right) > 0 \end{cases}$$

The foregoing calculations to determine the distance and angle are preferably conducted periodically. For example, each iteration may be triggered after traveling a predetermined distance, such as one meter.

Figure 4:
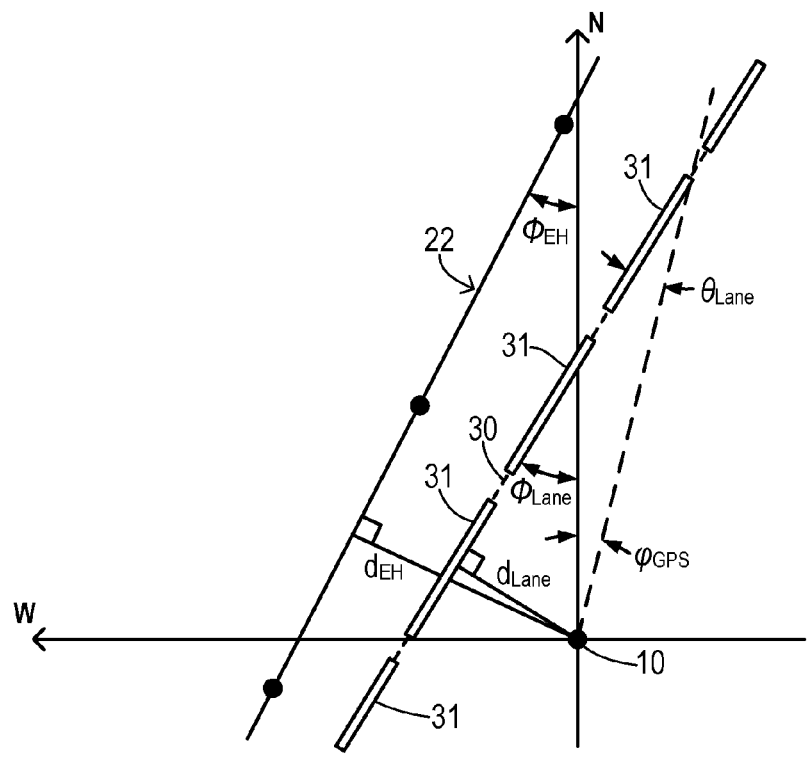
FIG. 4 shows a relationship between an actively-detected lane border from an optical system to a pathline determined using geopositioning.

Whenever the actual lane border is actively being detected by the optical sensing system, an offset between the detected lane placement and the map-derived pathline can be determined as shown in FIG. 4. The optical system provides a first lane model representation which preferably includes a lane offset distance $d_{Lane}$ and a heading $\phi_{LANE}$ (likewise measured with respect to north). Lane heading $\phi_{LANE}$ may preferably be determined in response to an actual vehicle heading $\phi_{GPS}$ derived from the GPS navigation or dead-reckoning system and a lane travel angle $\theta_{LANE}$ between the travel path of the vehicle and the edge of the lane. If angles $\phi_{EH}$ and $\phi_{LANE}$ are approximately the same and if pathline 22 maintains a consistent spacing from the detected lane boundary then a sufficiently high confidence can be had in pathline 22 for reconstructing a lane boundary when the optical system is unable to create a valid output.

In FIG. 4, a line 30 represents a lane path relative to vehicle 10 that has been derived by the optical lane monitoring system. The detection may be based on the presence of painted lane lines 31, for example. By combining the heading angle with respect to the lane layout from the vision system with an actual vehicle heading direction determined from the GPS and/or dead-reckoning system, an absolute lane heading $\phi_{LANE}$ is determined. A difference between the angles $\phi_{EH}$ and $\phi_{LANE}$ is calculated and the difference is compared to a threshold $\Delta\phi$. If the difference is less than $\Delta\phi$ then a high confidence may be placed in the Electronic Horizon data as long as the separation distance between the vision-based lane border and the EH-derived pathline has also remained sufficiently consistent. In other words, a variance of the offset over a series of consecutive measurements must be sufficiently small. If the magnitudes of each of these discrepancies between the two lane models is below a respective threshold, then a confidence level exists in order to reliably generate the lane boundary from the EH-derived pathline.

The variance is preferably calculated as a moving average of the difference between distances $d_{EH}$ and $d_{LANE}$. Preferably, the average may take the form of either a statistical variance $\sigma^2$ or a standard deviation $\sigma$. The confidence is high if the variance is below a respective threshold and confidence is low if it is above the threshold. In one embodiment, a confidence level is tracked using a count that is accumulated over a series of the periodic measurements. The count tracks a consecutive number of samples in which the variance is below the threshold. Once the consecutive count reaches a predetermined number (i.e., a confidence threshold), then the pathline can be reliably used to reconstruct a lane boundary in the event of loss of optical detection. Otherwise, no detection can be made of the lane.

Figure 5:
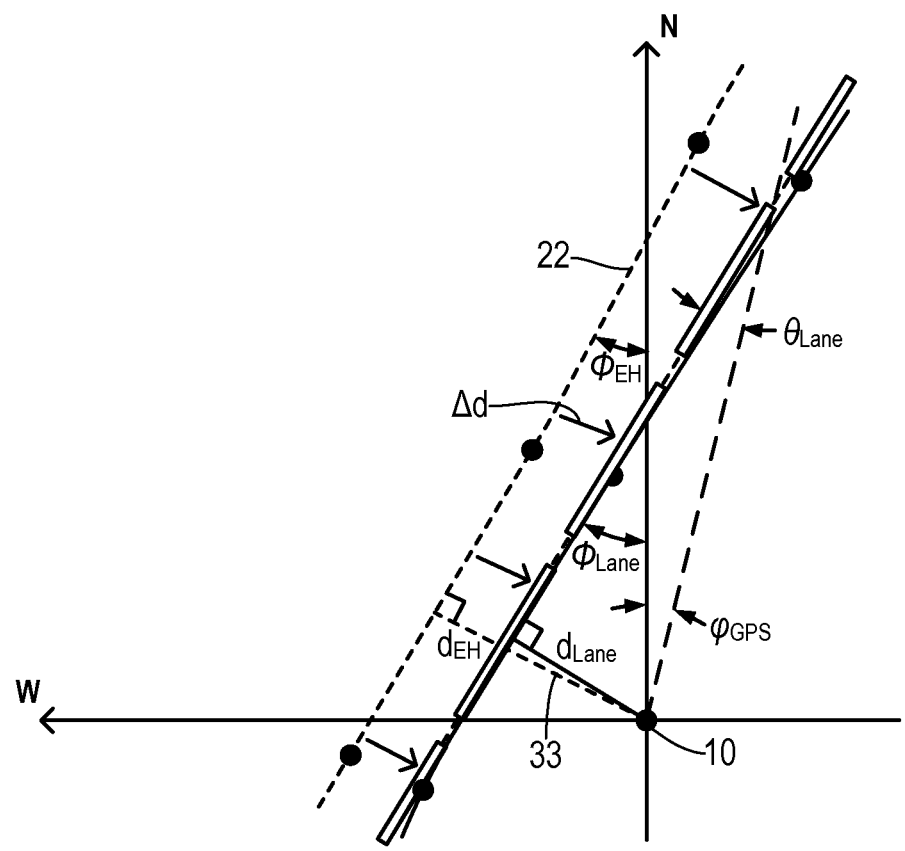
FIG. 5 shows the shifting of a pathline to coincide with an optically-detected lane.

FIG. 5 shows a process of shifting a pathline 22 in order to convert it into a second lane model based on roadway data from the map database and refined according to the recent performance of the optically-detected lane position. Thus, pathline 22 is shifted by a distance $\Delta d$ calculated as the distance between $d_{EH}$ and the most recent valid lane offset distance $d_{Lane}$ from the optical tracking system. In particular, pathline 22 is shifted along line 33 having the shortest distance between pathline 22 and vehicle 10 (i.e., shifted laterally) so that the same heading $\phi_{EH}$ is retained. Unless a lane change is detected, the shifting distance $\Delta d$ is used for converting the pathline into the second lane model while the vehicle traverses the same roadway until either the optical detection is again recovered and becomes valid or confidence falls below a threshold.

Figure 6:
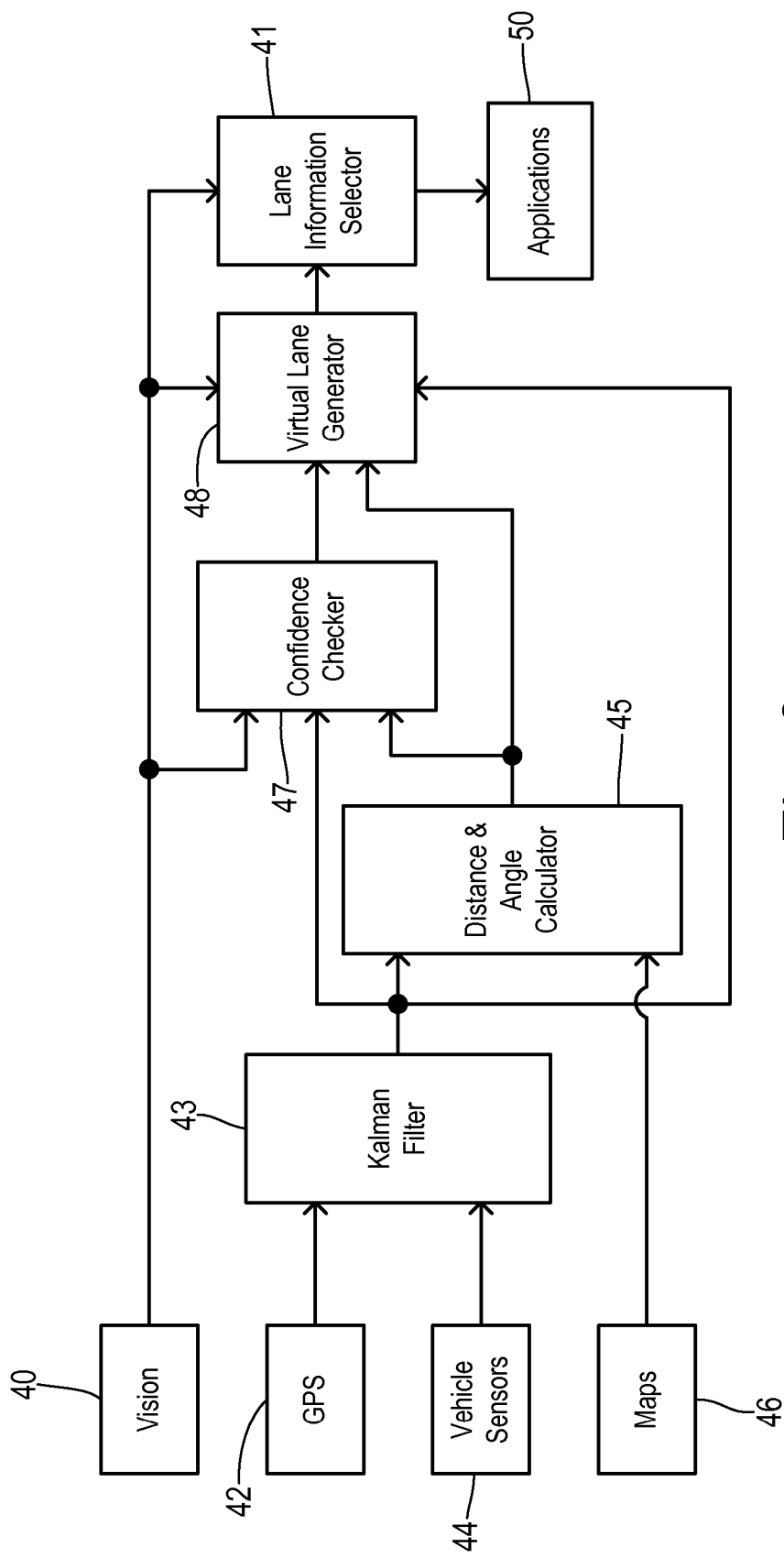
FIG. 6 is a block diagram showing one preferred apparatus of the invention.

FIG. 6 shows one preferred apparatus of the invention as implemented on a vehicle. A vision (i.e., optically-based) lane tracking system 40 provides a first lane model stored in its memory to a lane information selector 41. Selector 41 gives the optical-based lane model priority so that it is automatically selected whenever vision system 40 indicates that it provides a valid output. The vehicle apparatus further includes a conventional GPS navigation system 42 for providing instantaneous vehicle coordinates, speed, and heading to a Kalman filter block 43. The vehicle includes dead-reckoning sensors 44 such as inertial sensors, accelerometers, yaw rate sensors, wheel speed sensors, steering wheel angle sensor, and others for obtaining independent values for the vehicle location, speed, and heading which are also provided to Kalman filter 43. As known in the art, Kalman filter 43 integrates the position, speed, and heading information from GPS system 42 and dead-reckoning system 44, and provides their optimal estimates. A vehicle state comprised of a position, velocity, and heading from Kalman filter 43 is input to a distance and angle calculator 45 which is also connected to a digital map database 46. Based on the vehicle coordinates, a roadway is identified and the corresponding pathline is retrieved from map database 46 in order to find the offset distance and angle heading for the pathline in calculator 45. The resulting pathline is input into a confidence checker 47 along with the first lane model from vision system 40 and the vehicle state from Kalman filter 43. Confidence checker 47 compares discrepancies between the optically-based lane model and the map-determined pathline to one or more thresholds in order to determine a confidence level.

A virtual lane generator 48 receives the confidence level from confidence checker 47, the pathline and offset distance from calculator 45, and the first lane model from vision system 40. Based on the offset distance, virtual lane generator 48 shifts the pathline so that it coincides with the previously determined offset between the vehicle and the lane border from vision system 40.

The second lane model based on the tracked vehicle position and roadway data from the map database is provided from the memory of generator 48 to one input of lane selector 41. The confidence level is also provided to lane selector 41 so that when the first lane model from vision system 40 loses validity, selector 41 checks the confidence level and then outputs the virtually-generated lane of the second lane model only if confidence is high. Otherwise, it outputs no lane model at all. Any lane model data that is output from selector 41 is coupled to applications 50 such as a lane departure warning system.

Figure 7:
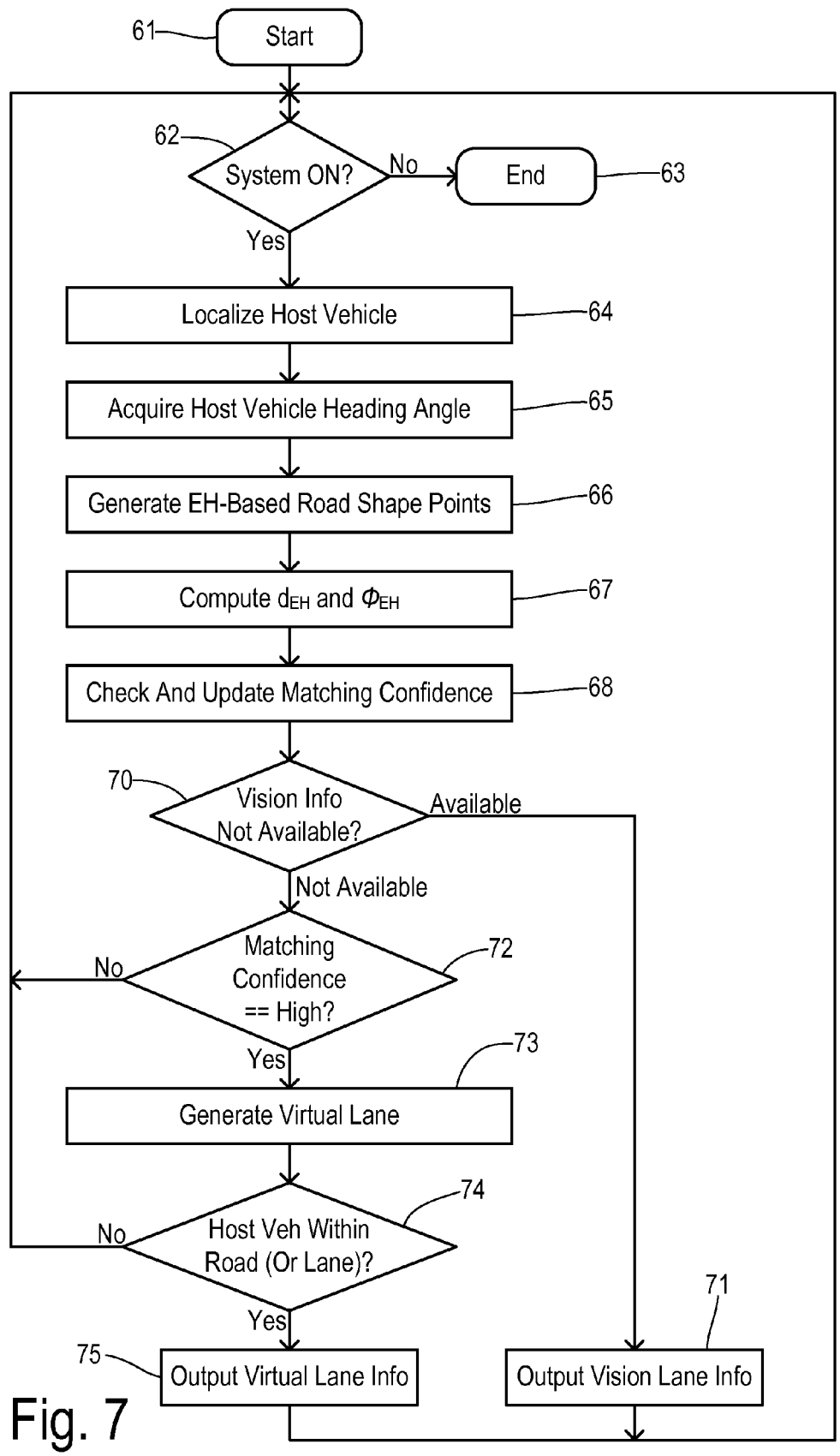
FIG. 7 is a flowchart showing one preferred method of the invention.

FIG. 7 summarizes a preferred method of the invention that starts with step 61. A check is performed in step 62 to determine whether the lane monitoring system is on. If not, then the process ends at step 63. Otherwise, the host vehicle is localized in step 64 (e.g., using a GPS receiving unit). A host vehicle heading angle is acquired in step 65 and interpolated road shape points are generated in step 66 based on road shape points specified as a pathline for the roadway from a digital map. In step 67, the shortest distance $d_{EH}$ from the origin (i.e., vehicle location $x_0, y_0$) to the piecewise linear pathline connecting the roadway shape points and the heading angle $\phi_{EH}$ are both computed.

The matching confidence for the map-derived pathline is checked and updated in step 68. For example, a confidence number may be maintained. If the matching conditions for the heading and offset distances are met as described above in connection with FIG. 4, then the confidence number is incremented. Otherwise, the confidence number is decremented. The confidence number may be range-limited between zero and a predetermined positive integer. A confidence level threshold may be defined as another positive integer within the range. Thus, the confidence may be defined as high whenever the confidence number is above the predetermined threshold and defined as not high otherwise.

A check is made in step 70 to determine whether the vision-based lane information is available. If available, then the vision derived lane information is output in step 71 and a return is made to step 62 for the next iteration.

If vision information is not available in step 70, then a check is made in step 72 to determine whether the matching confidence is high. If not, then no lane information is output to the applications and a return is made to step 62. If matching confidence is high, then the virtual lane of the second lane model is generated in step 73. Optionally, a check is performed in step 74 to determine whether the host vehicle is still within the target roadway or lane. If not, then a return is made to step 62 for the next iteration without outputting a lane model (and the confidence number may preferably be reset). Otherwise, the virtual lane information of the second lane model based on the map derived information is output in step 75 before returning to step 62.

As used herein, the matching confidence (i.e., similarity between the two lane models) can be characterized according to various alternative tests or thresholds. Since the heading derived from each model should be the same, the difference can be compared to a threshold. Since the lateral offset distance from the vehicle to the lane border and the vehicle to the map pathline may often not be the same, but instead have a difference which should stay substantially constant, a variance or standard deviation to exhibited by the difference over time is used in the illustrated embodiment.

What is claimed is:

1. Apparatus for a vehicle operated on a roadway having lane markers, comprising:
   an optical sensor providing optical data of the roadway;
   a first lane model stored in an electronic memory in response to detected lane markers in the optical data;
   an electronic horizon system tracking a position of the vehicle and providing roadway data in response to the position, wherein the electronic horizon system includes a map database representing the roadway as a plurality of segments along a pathline;
   a second lane model stored in the electronic memory in response to the roadway data;
   a confidence checker comparing a discrepancy between the first and second lane models to a threshold in order to determine a confidence level; and
   an output selector that selects the first lane model when lane markers are detected in the optical data, and that selects the second lane model if the lane markers are not detected in the optical data and the confidence level is greater than a predetermined level;
   wherein the confidence checker a) determines a point on the pathline closest to the vehicle, b) determines a pathline heading in response to a direction of the pathline at the closest point, c) determines a lateral offset distance between the vehicle and the closest point, d) determines a virtual offset distance by shifting the pathline according to a difference between the lateral offset distance of the pathline and a lane marker offset distance from the first lane model, and e) determines the discrepancy in response to a difference between the lateral offset distance and the lane marker offset for a plurality of time samples.

2. The apparatus of claim 1 further comprising a driver assistance system that controls a driver assistance parameter, wherein the driver assistance system is coupled to the output selector and adjusts the assistance parameter in response to the model output by the output selector.

3. The apparatus of claim 1 wherein the second lane model generates a virtual lane boundary by lateral shifting of the pathline according to a distance between the pathline and the first lane model.

4. The apparatus of claim 3 wherein the electronic horizon system is comprised of a GPS navigation system.

5. The apparatus of claim 3 wherein the electronic horizon system is comprised of a dead-reckoning system.

6. The apparatus of claim 1 further comprising a pattern recognizer receiving the optical data and identifying the lane markers in the optical data to generate the first lane model.

7. The apparatus of claim 6 wherein the lane markers recognized by the pattern recognizer include painted lane lines and road edges.

8. A method of detecting a lane position of a vehicle on a roadway, comprising the steps of:
 maintaining a first lane model based on optical sensor data, wherein the first lane model includes a lane heading and a lane marker offset distance;
 maintaining a second lane model based on monitored vehicle position and a map database, wherein the second lane model includes a pathline heading and a virtual offset distance;
 obtaining a pathline representing the roadway from the map database;
 determining a point on the pathline closest to the vehicle;
 determining the pathline heading in response to a direction of the pathline at the closest point;
 determining a lateral offset distance between the vehicle and the closest point;
 determining the virtual offset distance by shifting the pathline according to a difference between the lateral offset distance of the pathline and the lane marker offset distance of the first lane model;
 evaluating a similarity of the models; and
 selecting an active lane model in response to whether lane markers are being detected in the optical sensor data and whether the similarity is above a predetermined similarity.

9. The method of claim 8 wherein the step of evaluating similarity is comprised of:
 monitoring a difference between the lateral offset distance and the lane marker offset for a plurality of time samples;
 determining a variance among the plurality of monitored differences; and
 detecting a similarity above the predetermined similarity if the difference between the pathline heading and the lane heading is less than a first threshold and if the variance is less than the second threshold.

10. The method of claim 8 wherein the step of evaluating similarity is comprised of:
 monitoring a difference between the lateral offset distance and the lane marker offset for a plurality of time samples;
 determining a variance among the plurality of monitored differences;
 incrementing a similarity count if the difference between the pathline heading and the lane heading is less than a first threshold and if the variance is less than the second threshold; and
 detecting a similarity above the predetermined similarity if the similarity count is above a third threshold.

11. The method of claim 8 wherein the first lane model is maintained using pattern recognition to identify lane markers in the optical sensor data including painted lane lines and road edges.

12. The method of claim 8 wherein the vehicle position is obtained using a GPS navigation system in the vehicle.

13. The method of claim 8 wherein the vehicle position is obtained using a dead-reckoning system in the vehicle.

14. Apparatus for a vehicle operated on a roadway having lane markers, comprising:
 an optical sensor providing optical data of the roadway;
 a first lane model stored in an electronic memory in response to detected lane markers in the optical data;
 an electronic horizon system tracking a position of the vehicle and providing roadway data in response to the position;
 a second lane model stored in the electronic memory in response to the roadway data;
 a confidence checker comparing a discrepancy between the first and second lane models to a threshold in order to determine a confidence level; and
 an output selector that selects the first lane model when lane markers are detected in the optical data, and that selects the second lane model if the lane markers are not detected in the optical data and the confidence level is greater than a predetermined level;
 wherein the first lane model includes an optical heading ($\phi_{Lane}$), wherein the second lane model includes an electronic horizon heading ($\phi_{EH}$), and wherein the discrepancy compared by the confidence checker to the threshold is comprised of an absolute value of a difference $\phi_{EH} - \phi_{Lane}$.

15. Apparatus for a vehicle operated on a roadway having lane markers, comprising:
 an optical sensor providing optical data of the roadway;
 a first lane model stored in an electronic memory in response to detected lane markers in the optical data;
 an electronic horizon system tracking a position of the vehicle and providing roadway data in response to the position;
 a second lane model stored in the electronic memory in response to the roadway data;
 a confidence checker comparing a discrepancy between the first and second lane models to a threshold in order to determine a confidence level; and
 an output selector that selects the first lane model when lane markers are detected in the optical data, and that selects the second lane model if the lane markers are not detected in the optical data and the confidence level is greater than a predetermined level;
 wherein the first lane model includes an optical vehicle to lane offset distance ($d_{Lane}$), wherein the second lane model includes an electronic horizon vehicle to pathline offset distance ($d_{EH}$), and wherein the discrepancy compared by the confidence checker to the threshold is comprised of a variance of $d_{EH} - d_{Lane}$.

* * * * *